June 11, 1957 E. KUSTUSCH 2,795,261
DEFORMABLE LOCKING STRIP IN COMBINATION
WITH CONVENTIONAL CONICAL HEADED SCREW
Filed June 2, 1955
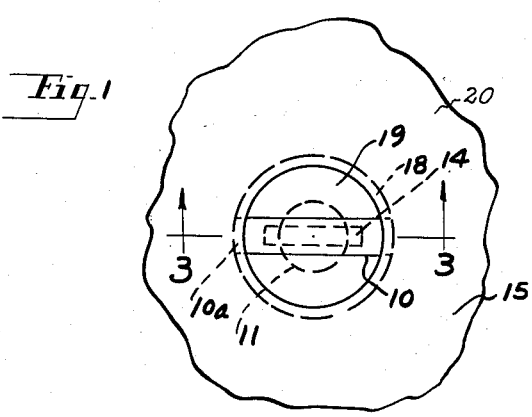
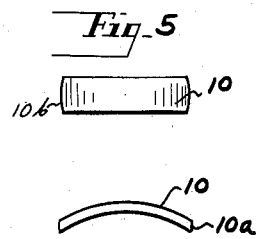
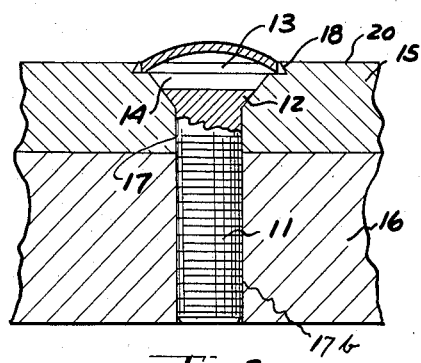
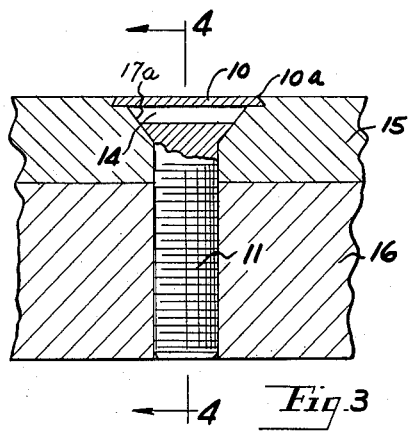
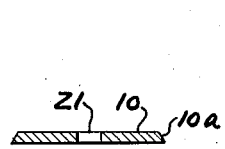
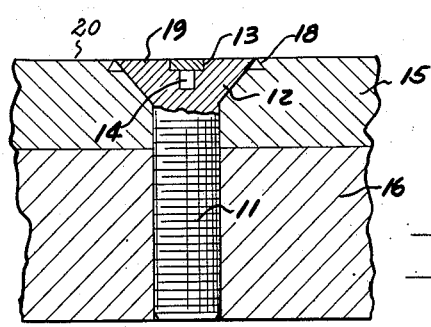
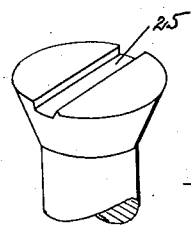
INVENTOR.
EDMUND KUSTUSCH
BY Louis Chayka
ATTORNEY.

United States Patent Office 2,795,261
Patented June 11, 1957

2,795,261

DEFORMABLE LOCKING STRIP IN COMBINATION WITH CONVENTIONAL CONICAL HEADED SCREW

Edmund Kustusch, Detroit, Mich., assignor to Paul W. Kustusch, Detroit, Mich.

Application June 2, 1955, Serial No. 512,605

1 Claim. (Cl. 151—41.74)

The object of the improvement is to provide a device of a very simple structure, which device may be applied for engagement with the head of a screw and the wall of the bore or socket in which the screw is located in such a manner that said device will prevent loosening or dislocation of the screw from the bore in which it is disposed.

The specific structure of the device and the bore into which the screw is to fit, as well as the advantages of employing said device, will be fully understood in the light of the following specification in which:

Fig. 1 is top elevational view of the head of a screw threaded into an object, the view including my locking device as applied to said head;

Fig. 2 is a vertical sectional view of the screw with the locking device placed upon the head thereof prior to its being flattened for engagement with parts of the bore in which the screw is located;

Fig. 3 is a vertical sectional view on line 3—3 of Fig. 1, the view disclosing the locking means in its operative position;

Fig. 4 is a sectional view on line 4—4 of Fig. 3;

Fig. 5 is a plan elevational view of the locking member;

Fig. 6 is a side elevational view of the same;

Fig. 7 is a sectional view of a modified locking device;

Fig. 8 is a perspective modified species of a screw with which the locking device may be used.

Similar numerals refer to similar parts throughout the several views.

The screw-locking device comprises a metal strip 10 of uniform width and thickness, the strip being normally bent into a bow-shaped form, as shown in Fig. 6. Each end portion of the strip is drawn to a radius, as shown at 10b in Fig. 5, and is defined at each end by a vertically-disposed face 10a. The strip, in its bow form, is of a length slightly in excess of the diameter of the head of the screw to which it is to be applied.

The screw 11 with which the strip is to be used includes a head 12, the latter being provided, at its top, with a relatively broad diametrical recess 13 and a slot 14 within the bottom of the recess, the slot being of the customary shape for application of a screwdriver.

The drawing shows the screw described above as it is used for the purpose of joining together two plates 15 and 16. The first of them, or the top one, is provided with a threaded bore 17 which, at its upper end, expands into a cone-shaped cavity 17a for reception of the expanded head of the screw, and which, along its rim, is provided with an undercut and overhanging annular lip 18. The lip is defined on its underside by a face standing outwardly. The lower plate, 16, contains a threaded bore 17b for reception of the stem portion of the screw.

The screw is threaded into the respective bores in the conventional manner by means of a screwdriver applied to the slot 14, till the upper surface 19 of the head of the screw is flush with the upper surface 20 of the upper plate, 15. Thereupon, the strip 10 is placed into the recess 14 when its end edges will extend slightly beyond the periphery of the head, as shown in Fig. 2. At this stage, the strip is flattened from above by slow pressure or by a hammer blow, causing the strip to elongate till the end faces 10a will have entered, at their respective ends of the strip, under the lip 18 of the undercut portion of the bore in said plate 15, as shown in Fig. 3. It will be noted that the end faces 10a of the strip will now be slanting downwardly and will bear against the slanting undersurface of the lip 18. Once the strip has been so flattened, the screw will be locked in against displacement.

If desired, the strip may be provided with a hole 21 midway its ends, as shown in Fig. 7, the hole serving for application of a suitable tool for removal of the strip from its position within the slot 14.

The screw shown in Fig. 8 contains the diametrical recess 25 analogous to recess 14 shown in other figures, but has no separate slot for the employment of a screwdriver, as the recess itself, while primarily intended for the reception of the locking member, may be used for application of the conventional screwdriver or a special one provided with a thicker driving blade.

It will be understood that a screw with which the strip is to be used does not have to be provided with a diametrically-expanded head, but that the screw may be of the same diameter along its full length. Furthermore, if a special slot or depression within the head of the screw is provided for the application of a screwdriver, this may be of any shape, specifically, in the form of a cross-slot or a polygonal recess, screws of this type being now in general use.

After having described my improvement, what I wish to claim is as follows:

In combination, a conventional screw including an enlarged standard conical head having a diametrical slot formed in the top face of said head, the bottom of the slot being flat, a member having a bore for the reception of the screw, said member being formed with a standard conical recess at the top of the bore to receive the standard conical head of the screw, said member being further formed with an annular groove opening into the outer face of said member to provide an undercut lip extending around the outer end of the conical recess without increasing the diameter of the conical recess at the outer surface of said member, said annular groove having a downwardly and outwardly slanting face, and a normally bowed locking strip formed from flat steel stock for disposition within the diametrical slot, said strip having its respective ends normally disposed parallel to the axis of the screw prior to its insertion and flattening in the slot, said locking strip when flattened increasing in transverse dimension to the screw axis and having its ends disposed at an angle to the axis of the screw to form slanting faces that will coincide with the slanting face of the annular groove and when in such position, having interlocking engagement with the opposite sides of the slanting face of the annular groove, with the top face of the flattened strip lying substantially flush with the upper face of said member and the bottom face of the flattened strip lying against the bottom of the diametrical slot in the head of the screw.

References Cited in the file of this patent
UNITED STATES PATENTS

| 231,588 | Kernochan | Aug. 24, 1880 |
| 1,897,253 | Gaubert | Feb. 14, 1933 |

OTHER REFERENCES

Ser. No. 382,653, K. Ozuka (A. P. C.), published May 11, 1943.